US011593589B2

United States Patent
Xu et al.

(10) Patent No.: US 11,593,589 B2
(45) Date of Patent: Feb. 28, 2023

(54) SYSTEM AND METHOD FOR INTERPRETABLE SEQUENCE AND TIME-SERIES DATA MODELING

(71) Applicant: Robert Bosch GmbH, Stuttgart (DE)

(72) Inventors: Panpan Xu, Santa Clara, CA (US); Liu Ren, Cupertino, CA (US); Yao Ming, Fuzhou (CN)

(73) Assignee: Robert Bosch GmbH, Stuttgart (DE)

( * ) Notice: Subject to any disclaimer, the term of this patent is extended or adjusted under 35 U.S.C. 154(b) by 343 days.

(21) Appl. No.: 16/778,379

(22) Filed: Jan. 31, 2020

(65) Prior Publication Data

US 2020/0364504 A1    Nov. 19, 2020

Related U.S. Application Data

(60) Provisional application No. 62/849,669, filed on May 17, 2019.

(51) Int. Cl.
    *G06K 9/62*     (2022.01)
    *G06N 3/049*     (2023.01)
    *G06N 3/08*     (2023.01)

(52) U.S. Cl.
    CPC ......... *G06K 9/6257* (2013.01); *G06K 9/6226* (2013.01); *G06K 9/6271* (2013.01); *G06N 3/049* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 10,210,244 B1* | 2/2019 | Branavan | G06N 5/041 |
| 10,747,957 B2* | 8/2020 | Wohlwend | G10L 15/22 |
| 2002/0184169 A1 | 12/2002 | Opitz | |
| 2015/0142710 A1 | 5/2015 | Hawkins et al. | |
| 2017/0293725 A1* | 10/2017 | Liu | G06F 16/24522 |

(Continued)

OTHER PUBLICATIONS

Bertens et al., "Keeping it Short and Simple: Summarising Complex Event Sequences with Multivariate Patterns", Aug. 2016, DOI: http://dx.doi.org/10.1145/2939672.2939761, San Francisco, CA, 10 pages.

(Continued)

*Primary Examiner* — Leon Viet Q Nguyen
(74) *Attorney, Agent, or Firm* — Brooks Kushman P.C.

(57) ABSTRACT

A novel interpretable and steerable deep sequence modeling technique is disclosed. The technique combines prototype learning and RNNs to achieve both interpretability and high accuracy. Experiments and case studies on different real-world sequence prediction/classification tasks demonstrate that the model is not only as accurate as other state-of-the-art machine learning techniques but also much more interpretable. In addition, a large-scale user study on Amazon Mechanical Turk demonstrates that for familiar domains like sentiment analysis on texts, the model is able to select high quality prototypes that are well aligned with human knowledge for prediction and interpretation. Furthermore, the model obtains better interpretability without a loss of performance by incorporating the feedback from a user study to update the prototypes, demonstrating the benefits of involving human-in-the-loop for interpretable machine learning.

20 Claims, 9 Drawing Sheets

(56) References Cited

U.S. PATENT DOCUMENTS

| | | | |
|---|---|---|---|
| 2018/0240026 A1 | 8/2018 | Pietrobon et al. | |
| 2019/0273509 A1* | 9/2019 | Elkind | G06N 3/08 |
| 2019/0361767 A1* | 11/2019 | Karthik | G06F 11/0781 |
| 2020/0112575 A1* | 4/2020 | Lin | G06F 40/126 |

OTHER PUBLICATIONS

Ribeiro et al., ""Why Should I Trust You?" Explaining the Predictions of Any Classifier", 2016, DOI: http://dx.doi.org/10.1145/2939672.2939778, San Francisco, CA, 10 pages.

Anonymous Authors, "Interpretable and Steerable Sequence Learning via Prototypes", KDD '19, Aug. 2019, Alaska, https://doi.org/10.475/123_4, 11 pages.

Rich et al., "Artificial Intelligence", The McGraw Hill Companies, 2009, New Delhi, 123 pages.

Hochreiter et al., "Long Short-Term Memory", Neural Computation p(8):1735-1780, 1997, Germany, 32 pages.

Li et al., "Deep Learning for Case-Based Reasoning through Prototypes: A Neural Network that Explains Its Predictions", Department of Computer Science, North Carolina, 8 pages.

* cited by examiner

Input: excellent food . extremely clean . the staff is friendly and efficient .
really good atmosphere .
Prediction: Positive (1.00)
Explanation:
(0.86) EXCELLENT FOOD . NICE decor . a little pricey for the propotions . the
salmon WAS AMAZING . -> Positive(1.58)
(0.68) GREAT FOOD SERVICE and views . hard to beat . this is our FAVORITE
<other> restaurant in the valley . -> Positive(1.23)
(0.50) GREAT FOOD GREAT SERVICE . vietnamese <other> rolls unbelievable . GREAT
food just what the neighborhood needed . -> Positive(2.82)

FIG. 5A

Prototype: PIZZA IS GOOD BUT I WON'T order again extremely SLOW delivery NOT
reliable at ALL
Weight: Negative(2.09)

Neighbors:
(0.76) service was exceptional but food was so bland i had a chicken sandwich
with parmesan fries and it was just ok
(0.76) food is good but they dont let you mix match like <OTHER> so for that u
get two stars bruh
(0.71) it was good but overpriced sorry but hot dogs ? and you gave it a fancy
<OTHER> no never again

FIG. 5B

Prototype: <other> IS AWESOME ! I LOVE cafe mix ! they have a GREAT selection
SUPER FRIENDLY staff DELICIOUS food !
Weight: (Positive(2.28))

Neighbors:
(0.78) this is a great location ! always busy fast and friendly staff and the
food is consistently good !
(0.77) <other> is a gem ! ! very helpful and so kind ! best greek and
mediterranean food come through to <other> 's ! !
(0.77) <other> was an amazing server ! love this place ! can't wait to come
here every thursday . also a stunning atmosphere !

FIG. 5C

Weight: universal ribosomal protein uL29 family(5.95)
Proto: MKAKEIRELSNEELQQKLSELKAELFNIREQLATGQLNEMRTDVRKTIARIKTILRERELGIKR Neighbors:
(0.98) MKASELRNVTDEELRNLLEEKKRQLMEIREQLAMGQLKNTSLIKKITKRDIARIKTILRERELGIKR
(0.96) MKAKELREMTNRELEAKILDELKEELFNIREQVATGQIENPMRIKQVRKDIARMKTILRERELNIS
(0.96) MKAKEIRQLTTAEIEQKIKSIKEELFNIREQLATGQLENTARIRQVRKDIARMKTILRERELAANK
(0.96) MKTNDIRELITTARIETKVKAILKELFNIREKVAIKELFNIREQLATGQLENPTRIRQVRKDIARMKTVREREIGINR
(0.96) MNISDIRQLSDIEIKKKLEDSHKELFEIRLKLSTRQLMHRELPRVKNDIARILLTVMREREIQIR
(0.95) MKTKEMDMTNAELDQRLAEILKGELFNIREQLATGQLNPLRIRNVRKDIARAKTIIIRENELKQARA

FIG. 6

```
Input: encoder r, training data X, prototype p_j
Parameters: beam width w
Output: projected prototype p̂_j, subsequence s
/* Find w sequences with minimum distance to p_j */
1  S ← BestCandidates(X,w);
2  s_opt ← NULL;
3  while S ≠ ∅ do
4      Ŝ ← ∅;
5      for s ∈ S do
6          s_opt ← BestCandidates({s_opt,s},1);
7          if |s| ≥1 then
               /* remove-one sub-sequences        */
8              Ŝ ← Ŝ ∪ {s/e_i | e_i ∈ s};
9      end
       /* Find w subsequences with the lowest scores
          using Equation 3, return Ŝ if there are less
          than w sequences in it.                  */
10     S ← BestCandidates(Ŝ,w);
11 end
12 p_j ← r(s_opt);
```

Algorithm 1: Beam Search

FIG. 9

SYSTEM AND METHOD FOR INTERPRETABLE SEQUENCE AND TIME-SERIES DATA MODELING

CROSS-REFERENCE TO RELATED APPLICATIONS

This application claims the benefit of U.S. provisional application Ser. No. 62/849,669 filed May 17, 2019, now expired, the disclosure of which is hereby incorporated in its entirety by reference herein.

TECHNICAL FIELD

This application generally relates to a system for generating explanatory information for decisions made by a machine learning algorithm.

BACKGROUND

Machine learning is being used more in devices and computing systems to make decisions or predictions. Despite their practical uses, machine learning algorithms generally lack transparency which limits their application in many critical decision-making scenarios. The demand for more transparent and intelligible machine learning system is becoming more urgent as recent regulations in the European Union require the "right to explanation" for algorithms used to make individual-level predictions.

SUMMARY

A system and method is disclosed for implementing a prototype sequence machine learning network. A processor may be operable to implement the prototype sequence machine learning network. The system and method may map one or more labeled sequence datasets using a sequence encoder to generate an embedded vector having a fixed length. It is contemplated that the sequence encoder may be designed using a long short-term memory (LSTM) network, a bi-directional LSTM network, or a gated recurrent unit (GRU) network.

A score may be determined between the embedded vector and one or more prototype vectors to generate one or more similarity vectors. The score may be assigned a value of zero when a sequence embedding of the embedding vector is different from the prototype vector. And, the score may be assigned a value of one when a sequence embedding of the single embedding vector that is the same as the prototype vector. The system and method may also classify one or more prediction values using a fully-connected layer that applies a weight matrix against each of the one or more similarity vectors.

The fully connected layer may also include a sparsity penalty and a non-negative constraint that constrains the weight matrix to one or more positive values. The sparsity penalty and the non-negative constraint may be operable to improve a learning process for the prototype sequence machine learning algorithm such that the one or more prototype vectors have more unitary and additive semantics. It is contemplated that during the training process at least one of the one or more prototypes may also be modified, revised, and/or deleted.

It is contemplated that the system and method may also compute a predicted probability for the labeled sequence dataset using a softmax layer that divides the exponential of each of the one or more prediction values by the sum of the one or more prediction values. A diversity regularization value may also be applied to the one or more prototypes to penalize at least a first of the one or more prototype vectors that is similar to a second of the one or more prototype vectors. A clustering regularization function may also be applied to the one or more labeled datasets and the one or more prototype vectors to ensure a clustering structure in a latent space. An evidence regularization function may also be applied to ensure the one or more prototype vectors are approximately equal to the one or more labeled sequence datasets.

The system and method may also be operable to assign the one or more prototype vectors with a sequence embedding vector provided from a training dataset. It is contemplated that the sequence embedding vector may be approximately equal to the one or more prototype vectors. It is also contemplated that assigning the one or more prototype vectors may occur at a predetermined epoch. The system and method may also project the one or more prototype vectors to a subsequence of events within a training dataset. A beam search algorithm may also be implemented to select a candidate that is determined to be substantially equal to the one or more prototype vectors.

BRIEF DESCRIPTION OF THE DRAWINGS

FIG. 5A depicts example explanations for the machine learning model as applied in a restaurant review application.

FIG. 5B depicts example explanations for the machine learning model as applied in a restaurant review application.

FIG. 5C depicts example explanations for the machine learning model as applied in a restaurant review application.

FIG. 6 depicts an example of a protype protein sequence and neighboring sequences in test data.

FIG. 9 depicts a possible beam search algorithm.

DETAILED DESCRIPTION

Figure 1:
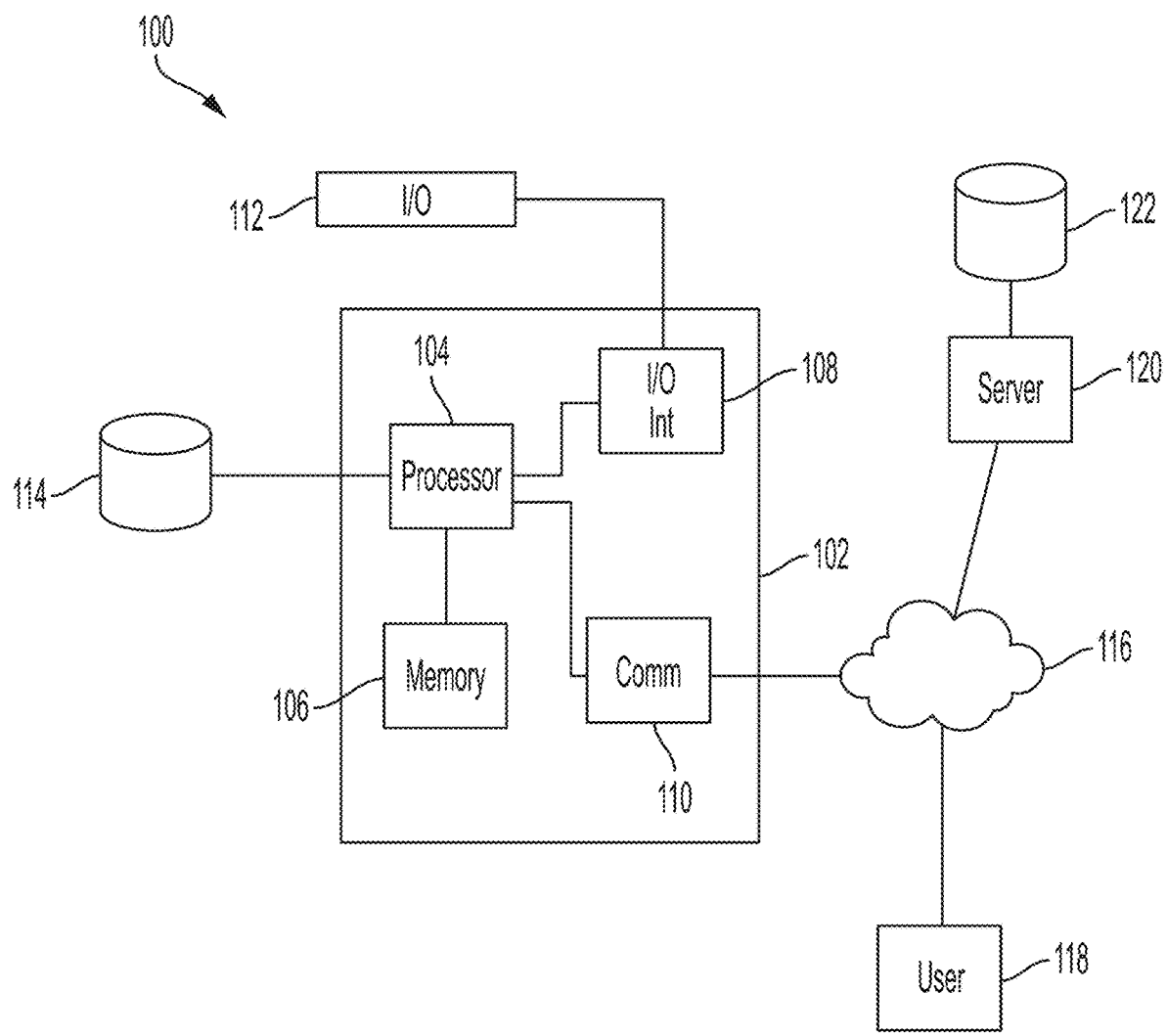
FIG. 1 is an example configuration for an interpretable sequence modeling system 100.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

One of the major challenges in machine learning nowadays is to provide predictions with not only high accuracy but also user-friendly explanations. Although in recent years we have witnessed increasingly popular use of deep neural networks for sequence modeling, it is still difficult to explain the rationales behind the model outputs, which is essential for building trust and supporting the domain experts to validate, critique and refine the model.

An interpretable and steerable deep sequence model with natural explanations derived from case-based reasoning is described herein. The prediction may be obtained by comparing the inputs to a few prototypes, which are exemplar cases in the problem domain. For better interpretability, several criteria may be defined for constructing the prototypes including simplicity, diversity, and sparsity. A learning objective and the optimization procedure are also defined. The system described provides a user-friendly approach to model steering: domain experts without any knowledge of the underlying model or parameters can easily incorporate their intuition and experience by manually refining the prototypes.

Applications include a wide range of real-world applications including predictive diagnostics for automobiles, electrocardiography (ECG), protein sequence classification, and sentiment analysis on texts. The system described is able to achieve accuracy on par with state-of-the-art deep sequence models. The model selects high-quality prototypes which align well with human knowledge and can be interactively refined for better interpretability without loss of performance.

Event sequence data is becoming pervasive in a variety of domains, e.g., electronic health records (HER) in health care, click streams in software applications, and vehicle diagnostic logs in automobiles. In general, an event sequence is a series of temporally-ordered events. With the advances in machine learning, particularly deep learning, there is a growing trend of research that applies sequence learning to assist decision-making in these domains. For example, by modeling diagnostic sequences collected from vehicle fleets, a system can predict diagnostic conditions that are likely to occur in the future. This may enable predictive maintenance for auto manufacturers and repair facilities and may improve customer experience and reduce warranty costs.

The most widely adopted method for modeling sequential data is Recurrent Neural Networks (RNNs) and associated variants, such as Long Short-Term Memory networks (LSTMs). RNNs have achieved remarkable performance in various sequence modeling applications, e.g., document/text classification, machine translation, and speech recognition. Despite their superior performance, RNNs are usually considered as "black-boxes" lacking transparency, limiting their application in many critical decision-making scenarios. The demand for more transparent and intelligible machine learning system is becoming more urgent as recent regulations in the European Union require the "right to explanation" for algorithms used to make individual-level predictions.

To address this challenge, a variety of techniques have been developed to unveil the inner-workings of deep sequence models through visualizing the changes in hidden states, extracting feature importance and constructing rules that mimic the behavior of RNNs. However, post-hoc explanations can be incomplete or inaccurate at capturing the reasoning process of the original model. Therefore, it is often desirable to have models with inherent interpretability in many application scenarios.

The described system leverages the concept of prototyping learning to construct deep sequence learning models with built-in interpretability. Prototype learning is a form of case-based reasoning that draws conclusions for new inputs by comparing them with exemplar cases (e.g., prototypes) in the problem domain. This is a natural practice in or day-to-day problem-solving processes. For example, physicians perform diagnosis and generate prescriptions based on their experience with past patients and mechanics predict potential malfunctions by remembering vehicles exhibiting similar symptoms. Prototype learning imitates such human problem-solving process for better interpretability. The concept may be incorporated in convolutional neural networks to built interpretable image classifiers. However, prototype learning is not yet explored for modeling sequential data.

The system described incorporates the design of a prototype sequence network, a new sequence learning model that combines prototype learning with RNNs to achieve both interpretability and high accuracy for sequence modeling. Using the RNN as the backbone captures the latent structure of the temporal development. Prediction on a new input sequence is performed based on the similarity to the prototypes in the latent space. The new model refinement method combines user knowledge as constraints to improve user trust.

The described system considers the criteria of simplicity, diversity, and sparsity for constructing prototypes of explanation. With respect to simplicity, it is possible to directly use the original sequences in the data as prototypes, but these sequences may contain irrelevant noises. In the described system, the prototypes can be subsequences of the original training data and contain only the key events determining the output. Shorter prototypes are preferred for presenting the explanation in a more succinct form.

With respect to diversity, redundant prototypes should be avoided since they add to the complexity of the explanation but do not improve performance. Therefore, the described system attempts to use a set of prototypes that are sufficiently distinct from each other. The prototypes also give a high-level overview of the original data which can be several magnitudes larger.

With respect to sparsity, for each input it is desirable that only a few prototypes are "activated" such that people are not overwhelmed with long and redundant explanations.

We introduce a novel learning objective which takes the above criteria into consideration and propose a training procedure which iteratively performs gradient descent and prototype projection. For steerable learning, we consider a constrained training process with a number of user-specified prototypes which reflect the experts' intuition and experience in the domain.

The system has been applied to and evaluated on several real-world datasets and it is able to achieve comparable performance with state-of-the-art deep learning techniques. The experiments cover a diverse range of applications including predictive maintenance of automobiles, classification of protein sequences, annotation of ECG signals and sentiment analysis on customer reviews, demonstrating the general applicability of the method. In each experiment classification accuracy on training and test data is reported and the intuitive interpretations of the result through concrete case studies and visualizations is demonstrated. The effect of the number of prototypes k and provide guidelines for selecting k are also disclosed. Studies may also be performed to explore the effect of including the diversity and the simplicity criteria in the model.

To further evaluate the interpretability of the prototypes, a user study on Amazon Mechanical Turk (MTurk) for a sentiment analysis task on customer reviews was performed. The result shows that the described system is able to select high quality prototypes that are well-aligned with human knowledge on natural languages for sentiment classification. Through learning under constraints with user-specified prototypes, the model can be steered to obtain comparable performance with better interpretability.

The described system discloses a sequence model that learns interpretable representations via sequence prototypes for predictive tasks. Also described is an interaction scheme that allows human experts to incorporate their domain knowledge by validating and updating the learned sequence prototypes.

The system described mimics our day-to-day problem-solving process by matching inputs with historical data and producing solutions accordingly. The described system differs from nearest neighbor classifiers used in typical case-based reasoning systems as only a few selected prototypes are memorized, simplified and used for reasoning. There are several benefits for including such sparsity: 1) for different inputs it is easier to compare the predictions as well as their interpretations, 2) the learned prototypes give a concise overview of the original data, which can be several magnitudes larger, and 3) it becomes possible to involve a human-in-the-loop approach to update the prototype interactively such that a human operator/user can incorporate their domain knowledge to further improve the interpretability of the model. The system incorporates the combination of prototype-based reasoning and deep neural networks (DNNs) for predictive analysis on sequential data.

There is no universally applicable method to evaluate the interpretability of machine learning models and it is usually use case and model dependent. Quantitative approaches measure the sparsity of the features or the complexity of the model (e.g. number of rules in decision trees). However how these metrics are correlated with human interpretability is still unknown. One technique may be to evaluate how good the prototypes explain the prediction results based on user studies conducted on MTurk.

The system and methods described herein may be implemented on a computing system. FIG. 1 depicts an example configuration for an interpretable sequence modeling system 100. The system 100 may include a computing system 102. The computing system 102 may include a processing unit 104 configured to executed instructions and programs. The computing system 102 may include volatile and non-volatile memory 106 that may be used for storing programs and data. The computing system 102 may include an input/output (I/O) interface 108 for interacting with external devices 112. The computing system 102 may include a communication interface 110 that is configured to provide communication with other devices and systems. For example, the communication interface 110 may include an Ethernet interface for connecting to an external network 116 or cloud. User devices 118 may be connected to the external network 116. Servers 120 may be coupled to the external network 116.

The computing system 102 may also interface with a local database 114. The local database 114 may provide additional storage capability. The server 120 may be connected to an external database 122 that may store relevant data. For example, the local database 114 and/or the external database 122 may store training and testing data for training the models disclosed herein. For example, the computing system 102 may be programmed to implement a machine learning model to generate outputs based on inputs that are entered from the external devices 112 or the user devices 118 via the external network 116. The computing system 102 may be programmed to update the machine learning model based on inputs receive and/or training data that is provided.

A machine learning model architecture is described herein. The machine learning model architecture may be implemented in the computing system 102. A labeled sequence dataset may be expressed as:

$$\mathcal{D} = \{((x^{(t)})_{t=1}^T, y)\} \quad (1)$$

where T is the sequence length, $x^{(t)} \in \mathbb{R}^n$ is an input vector at step t, and $y \in \{1, \ldots, C\}$ is the label of the sequence. The method described herein seeks to learn representative prototype sequences (not necessarily existing in the training database) that can be used as classification references and analogical explanations. For a new input sequence, its similarities with each of the representative sequences are measured in the learned latent space. Then, the prediction of the new instance can be derived and explained by its similar prototype sequences.

Figure 2:
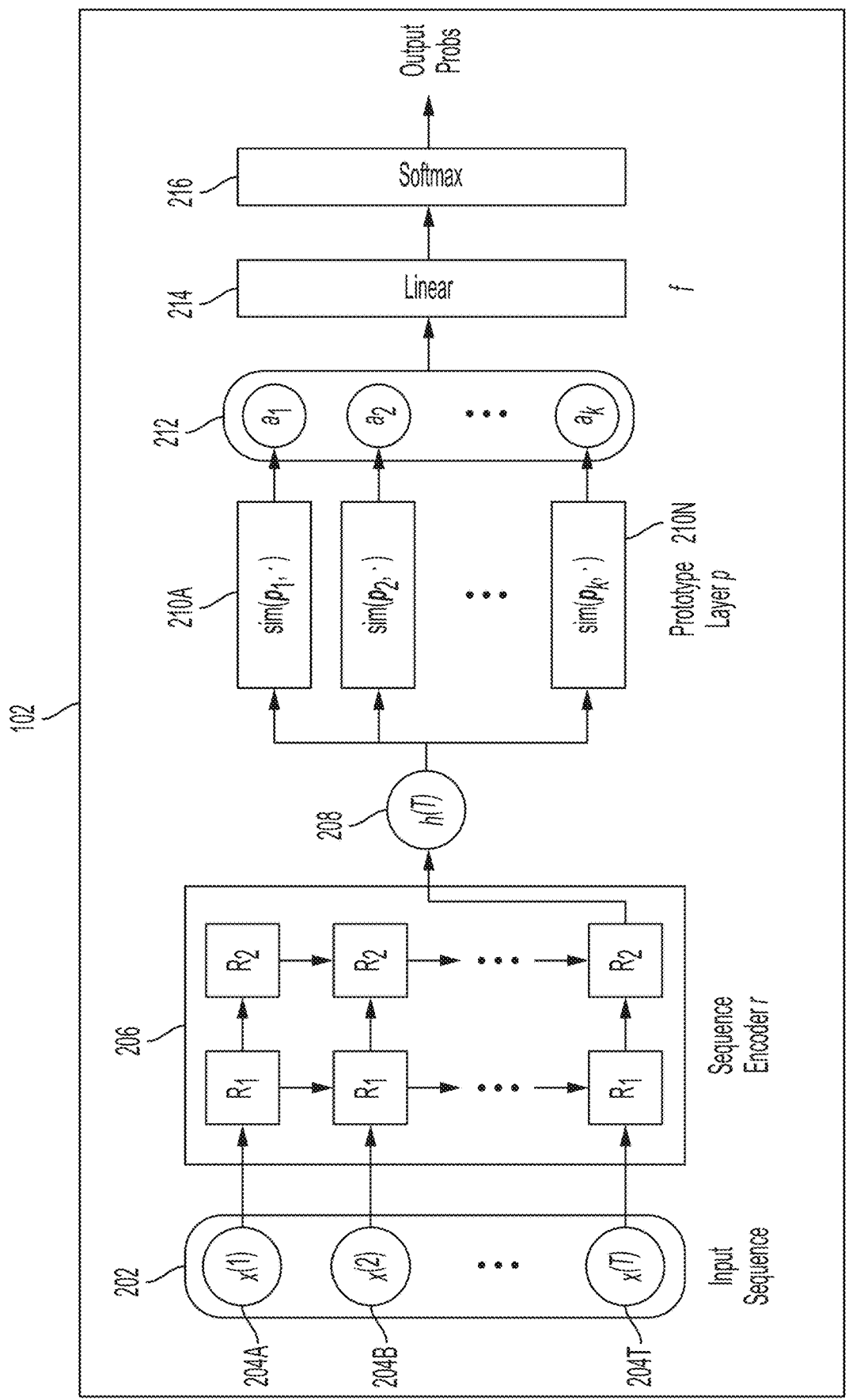
FIG. 2 depicts a machine learning model configuration for improved interpretability.

FIG. 2 depicts a possible model structure that may be implemented in the computing system 102. As shown in FIG. 2, the model may consist of three components: a sequence encoder r 206, a prototype layer p 210, and a fully-connected layer f 214. The input to the system may be an input sequence 202. The input sequence 202 may be comprised of input elements 204. The input sequence 202 may be represented as $(x^{(t)})_{t=1}^T$. The sequence encoder r 206 may map the entire input sequence 202 into a single embedding vector expressed as:

$$e = r((x^{(t)})_{t=1}^T), e \in \mathbb{R}^m \quad (2)$$

The embedding vector e may be of fixed length. The sequence encoder r 206 may implement a back-bone sequence learning model. For example, long short-term memory (LSTM), Bidirectional-LSTM and gated recurrent units (GRU) may be used. Some configurations may use the Bidirectional-LSTM as the recurrent sequence encoder r 206, and the cell state at the last step, $c^{(t)}$ may be used as the embedding vector. The hidden state at the last step 208, $h^{(t)}$, may be used as the embedding vector.

The prototype layer p 210 may contain k prototype vectors $p_i \in \mathbb{R}^m$ that have the same length as e. The prototype layer 210 may be configured to score the similarity between e and each prototype $p_i$. The prototype layer 210 may output a squared $L_2$ distance term that may be computed as:

$$d_i^2 = \|e - p_i\|_2^2 \quad (3)$$

To improve interpretability, a similarity score layer 212 may be implemented. A similarity score may be computed for each of the outputs of the prototype layer 210 as:

$$a_i = \exp(-d_i^2) \quad (4)$$

The similarity score may convert the distance to a score between zero and one. Zero may be interpreted as the sequence embedding e being completely different from the prototype vector $p_i$, and one may be interpreted as the sequence embedding e is identical to the prototype vector pi.

Once the similarity vector, a=p(e), is computed, the fully-connected layer 214 may be executed to compute z=Wa, where W is a C×k weight matrix and C is the output size (the number of classes in the classification tasks). Elements in the fully-connected layer 214 may be connected to all of the outputs of the similarity score layer 212. To enhance interpretability, W may be constrained to be non-negative. For multi-class classification tasks, a softmax layer 216 may be used to compute the predicted probability as:

$$\hat{y}_i = \exp(z_i)/\Sigma_{j=1}^{C} \exp(z_j) \quad (5)$$

The goal may be to train a model that is both accurate and interpretable. Training the network may set the weighting factors within the model to achieve acceptable performance. The model may be trained by updating the weighting factors and evaluating the results (e.g., based on a loss function). The process may be iterated until the desired results are achieved. During training the weighting factors may be updated according to a predetermined algorithm (e.g., gradient descent). For accuracy, a cross-entropy loss may be minimized on the training set. The cross-entropy loss may be expressed as:

$$CE(\Theta, \mathcal{D}) = \Sigma_{((x)^{(t)})_{t=1}^T, y) \in \mathcal{D}} y \log(\hat{y}) + (1-y)\log(1-\hat{y}) \quad (6)$$

where $\Theta$ is the set of all trainable parameters of the model.

Experimental results indicate that when the number of prototypes k is large (e.g., greater that 2-3 times the number of classes), the training may result in a number of similar or even duplicate prototypes (some prototypes are very close to each other in latent space). Having multiple similar prototypes in the explanations can result in confusion and inefficiency in utilizing model parameters. To prevent this, a diversity regularization term may be incorporated that penalizes prototypes that are close to each other. The diversity regularization term may be expressed as:

$$R_d(\Theta) = \Sigma_{i=1}^{k} \Sigma_{j=i+1}^{k} \max(0, d_{min} - \|p_i - p_j\|_2)^2 \quad (7)$$

where $d_{min}$ is a threshold that classifies whether two prototypes are close or not. In some examples, the value of $d_{min}$ may be set to 1.0 or 2.0. $R_d$ is a soft regularization that exerts a larger penalty on smaller pairwise distances. By keeping prototypes distributed in the latent space, a sparser similarity vector, a, may be produced.

To further enhance interpretability, a penalty, $L_1$, may be added to the fully-connected layer f 214 to constrain the weight matrix W to be non-negative. The $L_1$ sparsity penalty and non-negative constraints on the fully-connected layer f 210 help to learn sequence prototypes that have more unitary and additive semantics for classification.

To improve interpretability, a clustering regularization term $R_c$ and an evidence regularization term $R_e$ may be adopted. The clustering regularization term $R_c$ may encourage a clustering structure in the latent space by minimizing the squared distance between an encoded instance and its closest prototype. The clustering regularization term $R_c$ may be expressed as:

$$R_c(\Theta, \mathcal{D}) = \Sigma_{((x)^{(t)})_{t=1}^T \in \chi} \min_{i=1}^{k} \|r(x^{(t)})_{t=1}^T - p_i\|_2^2 \quad (8)$$

where $\chi$ is the set of all sequences in the training set D. The evidence regularization term $R_e$ encourages each prototype vector to be as close to an encoded instance as possible and may be expressed as:

$$R_e(\theta, D) = \sum_{i=1}^{k} \min_{((x)^{(t)})_{t=1}^T \in \chi} \|p_i - r(x^{(t)})_{t=1}^T\|_2^2 \quad (9)$$

The complete loss function to be minimized may be expressed as:

$$\text{Loss}(\Theta, \mathcal{D}) = CE(\Theta, \mathcal{D}) + \lambda_c R_c(\Theta, \mathcal{D}) + \lambda_e R_e(\Theta, D) + \lambda_d R_d(\Theta, D) + \lambda_{l_1} \|W\|_1 \quad (10)$$

where $\lambda_c$, $\lambda_e$, $\lambda_d$, $\lambda_{l_1}$ are hyperparameters that control the strength of the regularizations. The configuration of these hyperparameters depends on the nature of the data and may be selected through cross-validation.

A stochastic gradient descent (SGD) algorithm with mini-batch may be used to minimize the loss function on the training data. Since the gradient $R_e$ requires the computation on the whole training set, the minimization may be relaxed to be computed only in every single batch. A prototype projection technique may be used to learn simple and interpretable prototypes. The optimization procedure may iteratively alternate between the SGD and the prototype projection steps.

Since the prototype vectors $p_i$ are representations in the latent space, they are not readily interpretable. Some approaches may jointly train a decoder that translates the latent space to the original input sequence space thereby making prototypes interpretable. However, such decoders may not necessarily decode prototypes to meaningful sequences. The disclosed system incorporates a projection during training that assigns the prototype vectors with their closest sequence embedding in the training set. The projection step may be expressed as:

$$p_i \leftarrow \arg\min_{e \in r(X)} \|e - p_i\|_2 \quad (11)$$

Each prototype vector $p_i$ may then be associated with a prototype sequence in the input space. The projection step may only be performed every few training epochs (e.g., four) to reduce computational cost. The projection step saves the effort of jointly training a sequence auto-encoder which can be computationally expensive. This assures that each prototype be an observed sequence that guarantees that the prototypes are meaningful in the real world.

Predictions from the model are readily explainable by consulting the most similar prototypes. When making predictions based on a new input sequence, the explanation may be generated along with the inference procedure. A prediction may be explained by a weighted addition of the contribution of the most similar prototypes. For example, the system may generate a prediction and explanation for an input as follows:

Input: pizza is good but service is extremely slow

Prediction: Negative

Explanation: 0.69*good food bus worst service (Negative 2.1)

0.30*service is really slow (Negative 1.1)

The numerical factors preceding the explanatory prototype sequences may represent the similarities between the input sequence and the prototypes. At the end of each prototype is an associated weight. The weights may be interpreted as the model's confidence in the possible labels of the prototype.

Although the prototypes are already readable after projecting to the observed sequences in the training data, it may still be difficult to comprehend a prototype sequence if it contains insignificant or irrelevant noisy events.

A procedure to simplify the projected prototype sequences may be introduced. Instead of projecting a prototype to a complete observed sequence, the prototype may be projected to a subsequence containing critical events. The modified projection step may be expressed as:

$$p_i \leftarrow r(seq_i) \qquad (12)$$

$$seq_i = \arg\min_{seq \in sub(\chi)} \|r(seq) - p_i\|_2 \qquad (13)$$

where sub ($\chi$) is the set of all possible subsequences of the data $\chi$, $|\cdot|$ computes an effective length of the subsequence. The complexity of the above operation is $O(2^T N)$, where N is the size of the training set and T is the maximum length of the sequences in $\chi$. The cost of the brute-force computation grows exponentially with T and may be unacceptable even for relatively short sequences.

To find an approximate solution, a beam search algorithm may be used that is a greedy breadth-first search algorithm that only retains the w best candidates. The value of w is referred to as the beam width. The algorithm may first select the w closest candidate sequences to the prototype $p_i$. The algorithm may then generate all possible subsequences that can be obtained by removing one event from any of the w candidates. The modified projection step may be evaluated for each subsequence. The w subsequences with the minimum scores may then be kept as candidates to continue the search in the next iteration. The subsequence with the minimum score may be the output. The complexity of the algorithm is now $O(wT^2N)$. In some examples, w may be set to three.

A beam search algorithm that may be used for prototype simplification is shown in FIG. 9. The BestCandidates(S,w) takes a set of sequences S, computes the score using equations (12) and (13) for each sequence, and returns w sequences with the lowest scores. The algorithm terminates when the subsequences are not reducible, or there are no better remove-one subsequences than the existing sequences in the set of candidates S.

Figure 3:
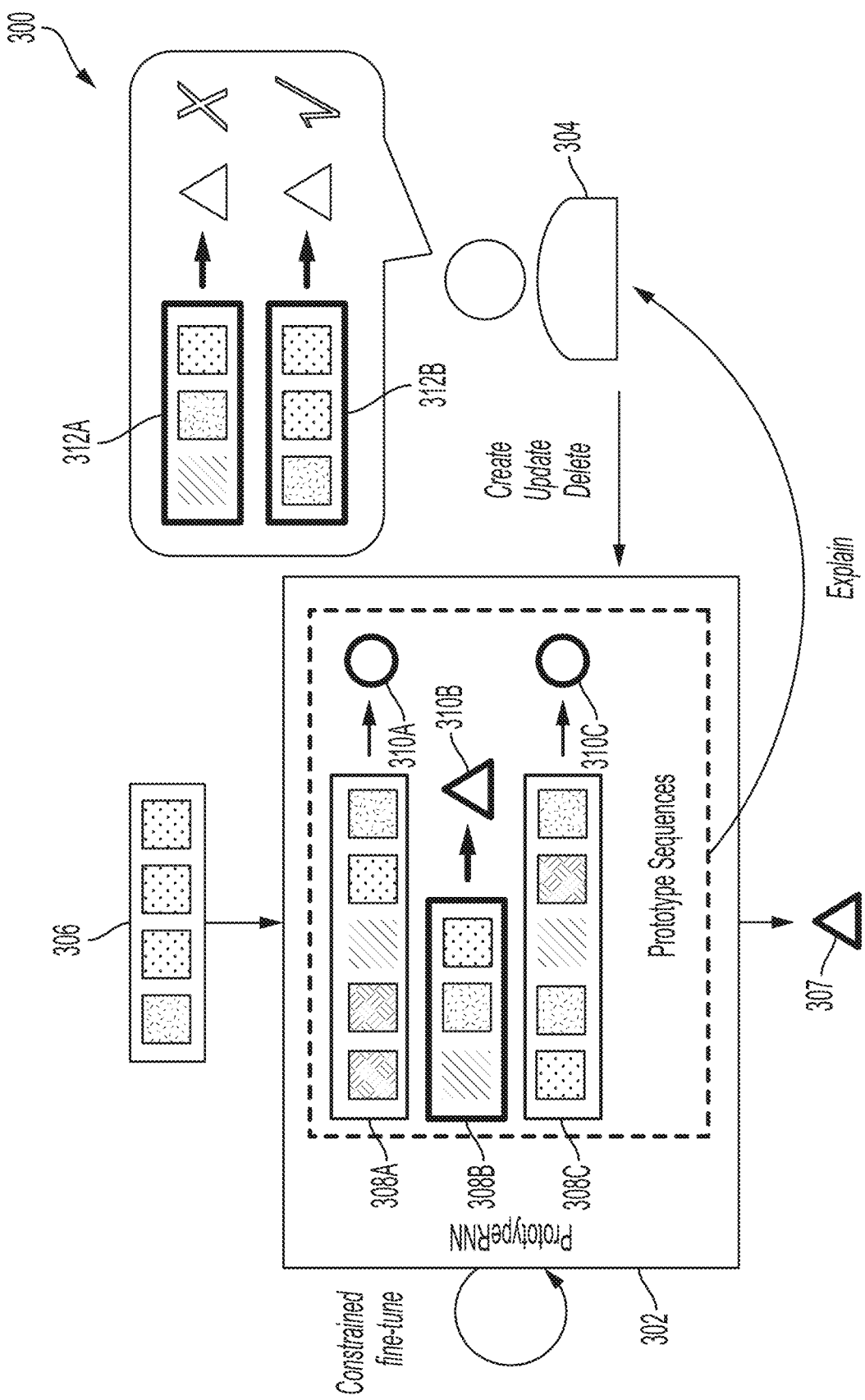
FIG. 3 depicts an example of user interaction for updating the machine learning model.

FIG. 3 depicts how users 304 can refine a trained model 302 for better interpretability and performance by validating and updating the prototypes 308, especially when the user 304 has certain expertise or knowledge in the problem domain. Allowing users 304 to validate and interact with the prototypes 308 can also increase their understanding of the model and the data, which is the foundation of user trust. In the example, an input sequence 306 is fed into the trained model 302 to generate a prediction 307. The trained model 302 includes prototypes 308. Associated with each of the prototypes 308 may be a prediction value 310. In the example, the user 304 may desire eliminate an prototypes 308 that match an input command 312A. In this case, prototype 308B matches the input command 312A and may be deleted from the model 302. The user 304 may desired to add a prototype based on input command 312B. The system may provide a user interface for interacting with the user 304 to permit entry of commands.

It is assumed that the knowledge of a user can be explicitly expressed in the form of input-output patterns that the user recognizes as significant or typical in the domain (e.g., "food is good" is typically a review with "positive" sentiment). These patterns can be regarded as the "prototypes" that the user learned from his/her past experiences. The refinement can thus be done by incorporating user-specified prototypes as constraints in the model.

Based on the users' past knowledge and observation of the model outputs, there are three types of possible operations that the user can apply to the model: create new prototypes, revise existing prototypes, or delete existing prototypes. After changes are committed, the model may be fine-tuned on the training data to reflect the change.

When fine-tuning the model, the prototypes may be fixed to reflect the users' constraints. The following revisions may be made to the optimization process. Instead of updating the latent prototype vectors $p_i$ in the gradient descent step, the updated sequence encoder r may be used in each iteration to directly set $p_i = r(seq_i)$. The prototype projection step may be skipped. After fine-tuning, the sequence encoder r learns better representations of the data. The user can verify the updated results and repeat the process until they are satisfied with the result.

The described system and methods may be used in a variety of applications. A first example may be a system for predictive diagnostics based on vehicle fault log data. Modern vehicles have complex interconnected modules and the faults usually have a significant history of development over a vehicle's lifetime. Fault logs collected from cars can therefore be used to understand the typical development paths of the problems and support predictive diagnostics. The fault log of each vehicle can be modeled as a sequence of events. Each event may correspond to one or multiple faults that happen at the same time. Each fault may be described with a five-digit Diagnostic Trouble Code (DTC) that is standard across different makes and models. The disclosed model and system may be applied to predict the risk of faults (e.g., DTCs) for a vehicle in the future using historical DTC logs. An event may be encoded as a multi-hot vector since multiple faults could occur at the same time. The input at each step is therefore a binary vector $x(t) \in \{0, 1\}^n$ and each element in the vector indicates if a particular fault has occurred. The prediction problem may be formulated as a multi-label classification task to predict the risk of different DTCs. In this example, the softmax layer may be replaced with a sigmoid layer to compute the output probabilities.

In an example, the system is applied to vehicle diagnostic data in which there are 12K total vehicle fault sequences containing 393 different types of DTCs. The classifier is trained to predict the top 92 DTCs that have occurred more than 100 times in the dataset. The sequences have an average length of 2.31. The dataset is split into 7.2K training, 2.4K validation, and 2.4K test sets. The system is trained with an LSTM encoder (1 layer, 50 hidden units) and 100 prototypes. The factors are set during training as follows: $\lambda_{11}=1.0$, $\lambda_e=0.1$, $\lambda_c=0.01$, $\lambda_d=0.01$, and $d_{min}=1.0$. For prototype simplification, the beam width is set as: w=3.

Figure 4:
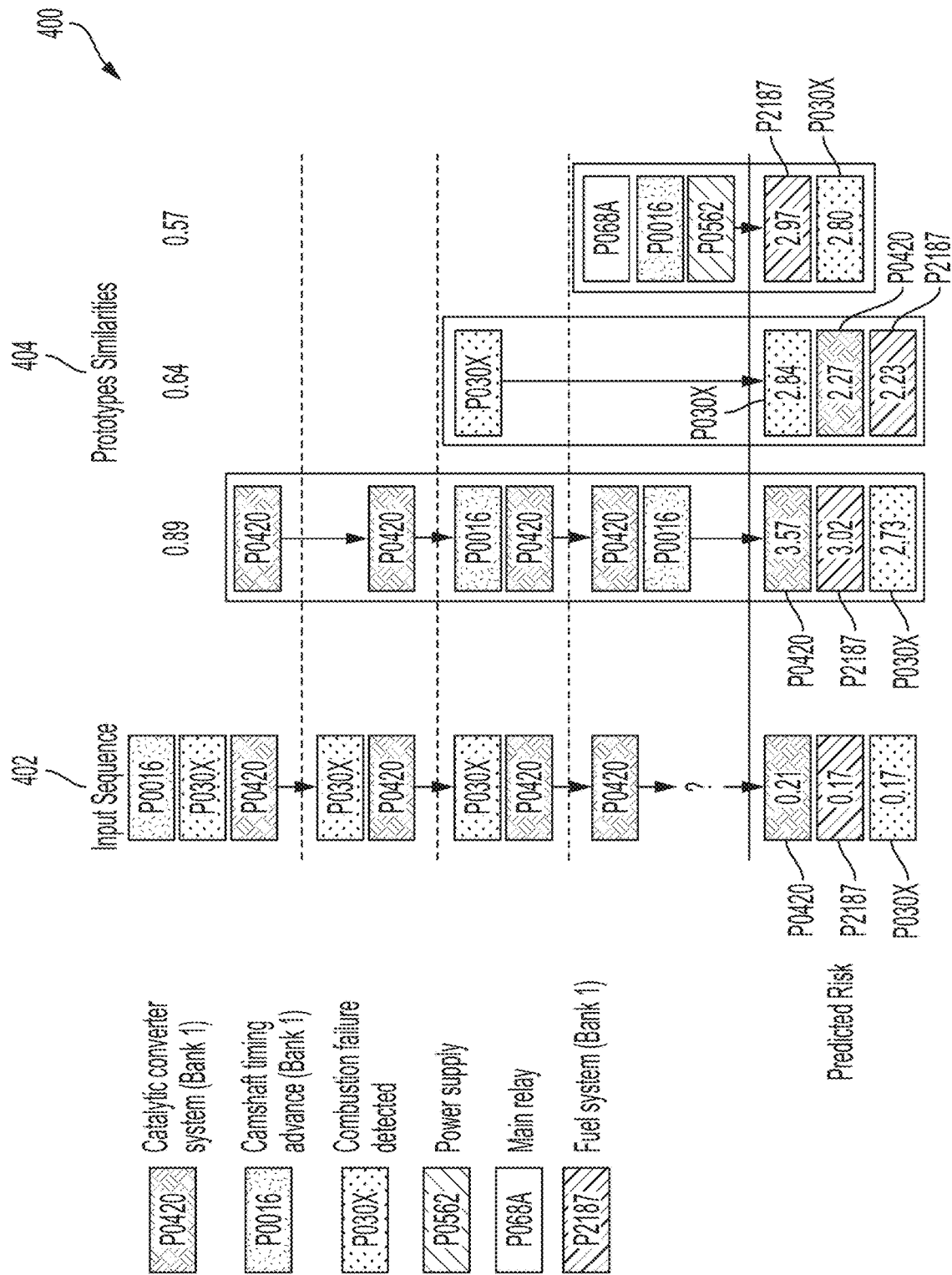
FIG. 4 depicts an example explanation using the machine learning model for a vehicle diagnostic system.

An example prediction 400 of the model on an input fault log sequence is shown in FIG. 4. An input sequence 402 shows a recurring sequence consisting of "P030X" and "P0420", while the model predicts a relatively high risk (0.17) of "P2187" which has not occurred before. "P2187" indicates a problem of the fuel system in the engine at Bank 1. With the given explanation, we can see that there are three prototypes 404 that match different aspects of the input sequence 402. All of the three prototypes 404 indicate a high risk of "P2187", which explains the reasoning for the prediction. A mechanic could utilize the model to predict potential future problems and ground the predictions on exemplar cases. The entire set of prototypes in the model provides an overview of all the fault development paths, which can help manufacturers identify systematic issues and develop preventive maintenance strategies.

The system may also be applied to a sentiment classification task on text data. For example, reviews of restaurants in the Yelp Open Dataset may be used. Each review is tokenized into a sequence of words using the Natural Language Toolkit (NLTK). In the example, only reviews that are less than 25 words in the experiments (106K reviews in total) are used as user studies indicate that shorter sentences are easier for humans to read and compare. Each of the reviews includes a star-rating. The stars (one to five) given with the reviews may be used as labels and experiments are conducted on both fine-grained (5-class) and binary (positive=rating≥3) classifications. The dataset is split into 60% training, 20% validation, and 20% test set. The resulting accuracy is comparable to algorithms such as Bi-LSTM encoder, LSTM, Bi-LSTM, and ResNet on both validation and test sets. The LSTMs have 2 layers, with 100 hidden units per layer. The ResNet contains 7 residual blocks. A dropout rate of 0.8 is applied during training. The initial number of prototypes is set to 100 and 200 in the binary and fine-grained classification tasks respectively. The result indicates that the disclosed model can learn interpretable representations while achieving similar performance compared with the state-of-the-art bi-directional LSTMs.

For sentiment classification tasks on Yelp Reviews, the review may be first filtered to contain only "Restaurant" reviews according to a "category" field of the business being reviewed. The review texts may then be tokenized into sequences of words using NLTK. For human evaluation purpose, the reviews may be filtered with a length (number of words) over 25. For both binary classification and fine-grained classification, the classes may be balanced by down-sampling. The size of the largest class is no more than twice the size of the smallest class. The vocabulary sizes are 6287 and 6792. Word embedding of size 100 may be used for all the models. The embedding may be jointly trained with the models.

FIG. 5 shows explanations and neighboring prototypes generated from an example sentiment analysis result. A first example review 502, results in a prediction and an explanation that results in referenced prototypes that show the different aspects of a good restaurant—good food and service. A second example 503 and a third example 504 depict neighboring prototype sequences related to a given prototype. Some prototypes represent frequent short phrases that are sentimentally significant. Some prototypes capture long-range semantics, such as the transition of sentiments via contrastive conjunctions (e.g., "but" in the second example 503). The analysis also discovered some interesting sequential "patterns" of how people express their sentiments. For example, a typical way of expressing positive sentiment is through multiple short compliments ended with exclamation marks such as in the third example 504. In the examples the input sequences and the prototype sequences may be matched through a latent distance measure through an LSTM rather than strict pattern matching. Similar patterns between prototypes and neighboring sequences are highlighted. Bold and uppercase text show the simplified prototype sequences.

The system may be applied in the biology domain using the UniProtKB database. The database contains 558,898 protein sequences manually annotated and reviewed. Protein sequences are composed of 20 standard amino acids and can be grouped into families. Proteins in a family descend from a common ancestor and typically have similar functions and 3D structure. The system may be applied to learn the sequential similarity within families.

The sequences may be clipped with a maximum length of 512 and the models may be trained to classify the top 100 families ranked by their size. The sequences are split into 58K training and 24K test sets. The parameters are set as: $\lambda_{11}=1.0$, $\lambda_e=0.1$, $\lambda_c=0$, $\lambda_d=0.01$, and $d_{min}=1.0$. The system includes a Bi-LSTM (2 layer×50 hidden units) and 200 prototypes. The batch size is set to 64 and the model is trained for 40 epochs. The model scores an accuracy comparable to other strategies. However, the system learns interpretable representations that reveal the significant subsequences for a family of proteins. An example of the prototype is shown in FIG. 6. Matching subsequences in the neighbors are highlighted.

The system and method may be extended to find meaningful prototypes in real-valued time series data using the MIT-BIH Arrhythmia ECG dataset. ECG is widely used in medical practices to monitor cardiac health. Correct categorization of the waveforms is critical for proper diagnosis and treatment. In the dataset, each signal consists of heartbeats annotated by at least two cardiologists. The ECG signals may be down-sampled to 125 Hz and the signals split into annotated heartbeats according to a predetermined protocol. The annotations may be mapped into five groups: Normal (N), Supraventricular Ectopic Beat (SVEB), Ventricular Ectopic Beat (VEB), Fusion Beat (F) and Unknown Beat (Q). The training and test set contain 87K and 21K sequences respectively.

Instead of discretizing the time series data into event sequences, an LSTM may be used directly to encode the real-valued sequence. The parameters may be set as: $\lambda_{11}=0.1$, $\lambda_e=1.0$, $\lambda_d=0.01$, $d_{min}=2.0$, and a dropout rate to 0.1. The network may be trained with a Bi-LSTM encoder (32 hidden units×3 layers) and 30 prototypes. The training may run for 36 epochs with a batch size of 128 and no prototype simplification applied. After removing prototypes with small weight ($\max(w_i)<0.1 \max(W)$), a model with 23 prototypes is obtained.

Figure 7:
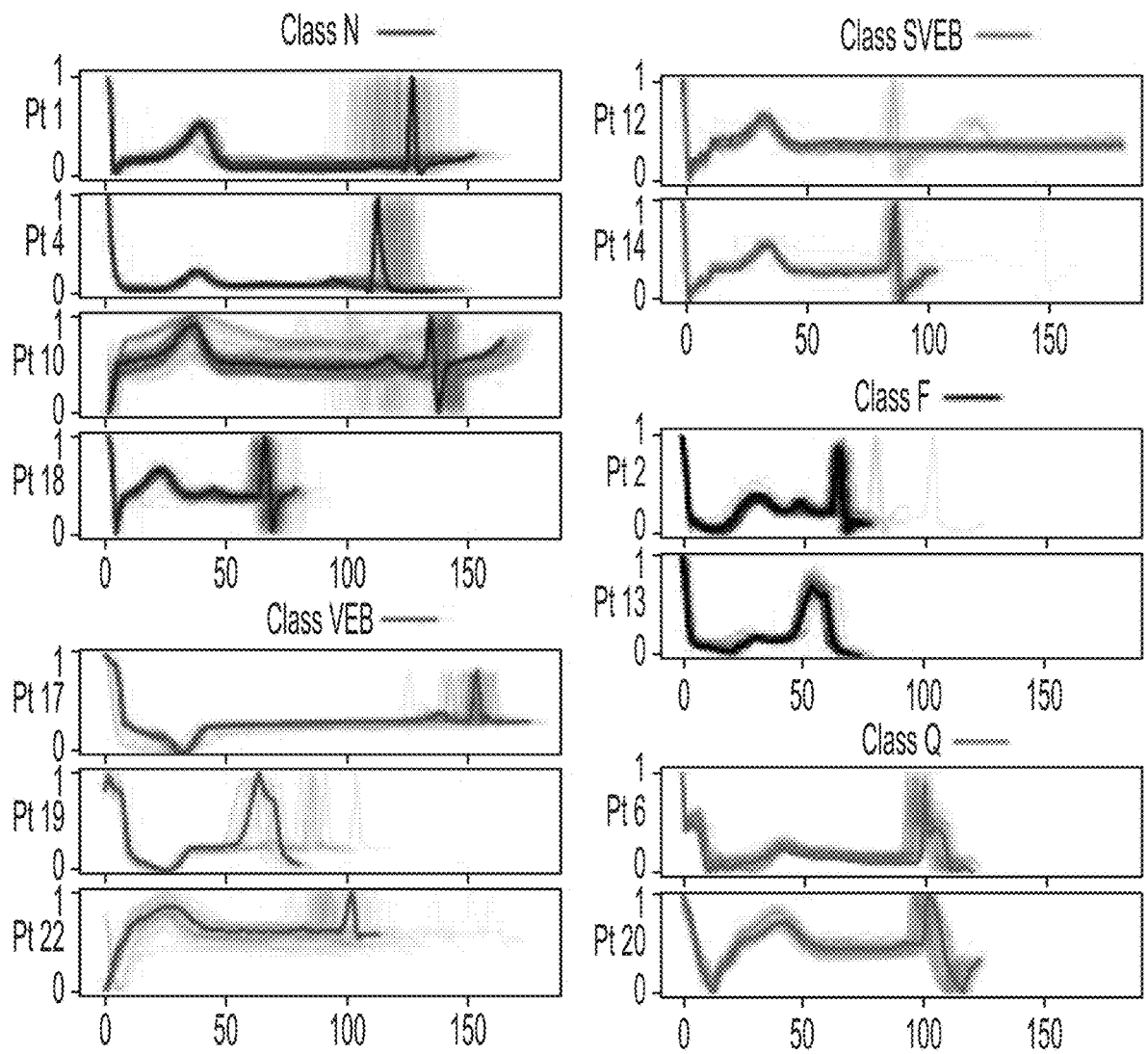
FIG. 7 depicts example prototypes of heartbeat signals.

A few selected prototypes are shown in FIG. 7. The disclosed system successfully learned a few prototypes for each class. Prototype 12 (Pt 12) shows a characteristic junctional escape beat (belonging to the SVEB group) that shows a long flat line corresponding to the dropped beat. Prototype 17 (Pt 17) shows a premature ventricular contraction beat with a strong contraction and a long pause between ventricular contraction. This demonstrates the capability of disclosed system in learning meaningful representations on ECG time series data that has also been verified by two independent cardiologists.

The disclosed system and model achieve comparable results when compared with the state-of-the-art models for classification of ECG heartbeats. The disclosed model can present verifiable and understandable prototypes that are very useful in the healthcare domain. In practice, the most similar prototypes can be presented side-by-side with the automatic annotations of the ECG signals for explanation.

When implementing the disclosed model, it is necessary to choose the of number of prototypes k. The proper selection may be investigated by analyzing the influence that the number of prototypes has on the performance of the system using the UniProtKB and Yelp Review data discussed previously herein. Using the same hyperparameter configurations as described previously, a series of models may be trained with different k values. The result is that the accuracy at first improves dramatically as k increases. The increasing slope quickly flattens after k exceeds 100 for UniProtKB and 40 for Yelp Reviews.

As the number of prototypes k increases, the accuracy improves. However, it may become more difficult to comprehend and differentiate such a large number of prototypes. Thus, there is a trade-off between accuracy and interpretability. In practice, since increasing k after a certain threshold only brings marginal improvement to the performance, one possible strategy is to first start from a small k (e.g., k=C to assume one prototype per class) and gradually increase k until the performance improvement falls below a certain threshold.

To study the effect of the diversity regularization term, the term may be removed by setting $\lambda_d=0$ and another set of experiments may be performed with varying prototype numbers. It is observed that the performance on UniProtKB is consistently lower without $R_d$ for different settings of k. The inclusion of $R_d$ also positively affects the performance on Yelp Reviews for larger k values.

Figure 8:
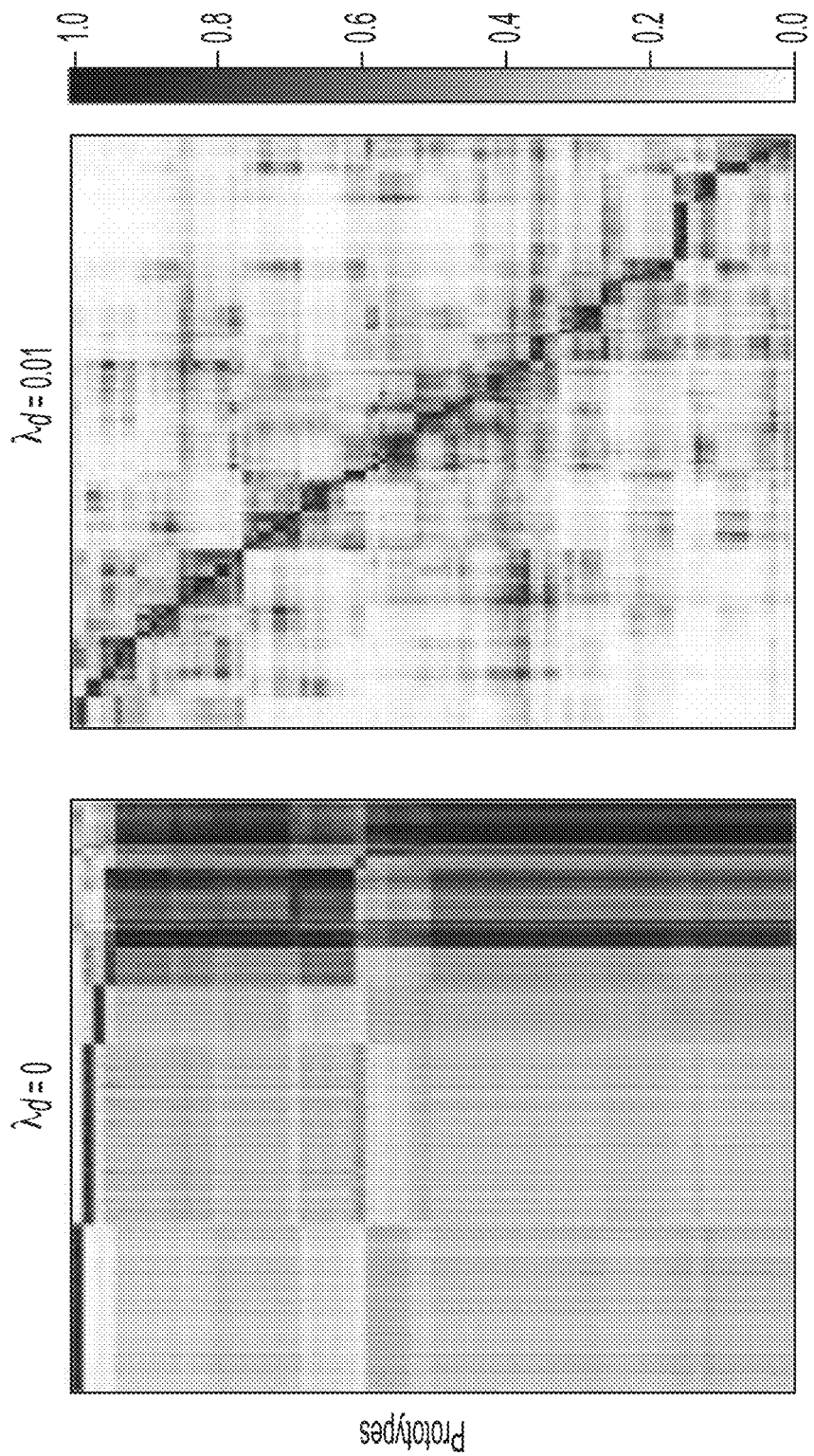
FIG. 8 depicts heatmaps showing the impact of a diversity regularization term.

The impact of $R_d$ may be further examined by plotting the similarity scores between the prototypes and test sequences as heatmaps for two networks with 100 prototypes (FIG. 8) on the Yelp Review data. Without diversity regularization ($\lambda_d=0$), most of the rows have similar horizontal patterns in the heatmap (FIG. 8), indicating near-duplicate prototypes. With $\lambda_d=0.01$ the similarity heatmap is much sparser and more diagonal, showing that the prototypes are more diverse and evenly distributed in the latent space.

The influence of prototype simplification on performance and subsequence lengths may be examined. The previous settings with $\lambda_d=0.01$ on the UniProt and Yelp Reviews may be used. The results indicate that there is no significant difference in accuracy on both datasets. However, with simplification applied, the average prototype (sub)sequence lengths are decreased from 20.1 to 15.1 on the Yelp Reviews and 274.5 to 130.7 on the UniProtKB dataset.

The interpretability of a machine learning model is a subjective concept, which is often regarded to be difficult to evaluate computationally. A quantitative evaluation of the interpretability of the network through experiments with human subjects is conducted. With the prototype learning structure, answers to the following questions are desired: 1) How understandable and accurate are the prototypes in explaining the predictions of the input sequences? 2) How would the incorporation of human knowledge influence the performance and interpretability of the model? The disclosed model trained on Yelp Reviews for binary sentiment classification may be used for evaluation. The model has 80 effective prototypes (i.e., the associated weight max($w_i$)>0.1 max(W)).

To evaluate the interpretability of the explanations, human participants that are non-experts in machine learning may be recruited on Amazon Mechanical Turk. Directly asking whether an explanation is interpretable or accurate is very subjective and varies for different people. Thus, a relative measure is adopted by asking the participants to select one of three prototype sentences that expresses the most similar sentiment to a given input sentence. The prototype in the model that has the largest similarity score to the input sentence is regarded as the proposed answer by the model and is presented as one of the options. The other options are randomly selected from the rest of the prototypes. The choices also include a "None of the above" as a fourth option. The input sentences are selected from the validation set with stratified sampling. That is, the sequences are divided into groups according to their most similar prototypes, and the groups are used as the strata for sampling.

A total of 70 questions were sampled and 20 responses were gathered from human subjects for each of the questions. After filtering the answers that failed a quality check (e.g., consistency check of the answers of duplicate questions), each question has 12.5 valid responses on average. The most voted options by human subjects were used as the correct answer to each question and used to compute the accuracy of human and the model. The model generally showed improved accuracy after updating the model from the interaction.

The 70 questions may be partitioned evenly to 4 questionnaires (e.g., each with 17 and 18 questions) to prevent participants from becoming overwhelming. Three additional quality check questions (e.g., duplicate questions with options in a different order, or questions with obvious correct answer) may be added. The responses that fails more than 1 quality-check questions may be filtered. The correct answer of each question may be computed using the most voted option. Responses that have accuracy lower than 50% may be filtered out. The human accuracy and the model accuracy may be computed using the most voted options as the correct answers.

To study how the input of human knowledge would affect the interpretability of the model, feedback from the user study may be used as a source of human knowledge to update the model and a second round of experiments may be performed on MTurk. Based on the result of the first-round user experiment, the model may be updated to improve the quality of the prototypes. The update protocol may be as follows. For each of the wrongly answered questions, the prototype sequence that is proposed as the answer by the model is checked, as well as its neighboring sequences in the validation set. If the neighboring sequences do not have consistent sentiment (with subjective judgment), this prototype may be deleted. If the neighboring sequences have consistent sentiment, but the provided prototype is not representative enough (e.g., part of the sentence has misleading meaning), a new sentence is selected from the neighboring sentences to replace the old prototype.

Following the above protocol, 13 prototypes were updated, and 5 prototypes were removed. After the incremental training completed, the performance of the model on the test set was basically unchanged (slightly increased by 0.1%). The process then performs the second user experiment with the same procedure. An average of 12.3 valid responses were collected for each question. The accuracy of the model's proposed answer increased significantly. The result shows that although the incorporation of human knowledge via the proposed interaction scheme may not necessarily increase the model's performance, it could be very helpful in improving the interpretability of the model.

A novel interpretable and steerable deep sequence modeling technique is disclosed. The technique combines prototype learning and RNNs to achieve both interpretability and high accuracy. Experiments and case studies on different real-world sequence prediction/classification tasks demonstrate that the model is not only as accurate as other state-of-the-art machine learning techniques but also much more interpretable. In addition, a large-scale user study on Amazon Mechanical Turk demonstrates that for familiar domains like sentiment analysis on texts, the model is able to select high quality prototypes that are well aligned with human knowledge for prediction and interpretation. Furthermore, the model obtains better interpretability without a loss of performance by incorporating the feedback from a user study to update the prototypes, demonstrating the benefits of involving human-in-the-loop for interpretable machine learning.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for implementing a prototype sequence machine learning network, comprising:
    mapping one or more labeled sequence datasets using a sequence encoder to generate an embedded vector having a fixed length;
    determining a score between the embedded vector and one or more prototype vectors to generate one or more similarity vectors, wherein a diversity regularization value is applied to the one or more prototype vectors to penalize at least a first of the one or more prototype vectors that is similar to a second of the one or more prototype vectors; and
    classifying one or more prediction values using a fully-connected layer that applies a weight matrix against the one or more similarity vectors.

2. The method of claim 1 further comprising: computing a predicted probability for the one or more labeled sequence datasets using a softmax layer that divides an exponential of the one or more prediction values by a sum of the one or more prediction values.

3. The method of claim 1, wherein the score is assigned a value of zero when a sequence embedding of the embedding vector is not substantially equal to the one or more prototype vectors.

4. The method of claim 1, wherein the score is assigned a value of one when a sequence embedding of the embedding vector is substantially equal to the one or more prototype vectors.

5. The method of claim 1, wherein a clustering regularization function is applied to the one or more labeled sequence datasets and the one or more prototype vectors, wherein the clustering regularization function ensures a clustering structure in a latent space.

6. The method of claim 1, wherein an evidence regularization function is applied to ensure the one or more prototype vectors are approximately equal to the one or more labeled sequence datasets.

7. The method of claim 1 further comprising: assigning the one or more prototype vectors with a sequence embedding vector provided from a training dataset, wherein the sequence embedding vector is approximately equal to the one or more prototype vectors.

8. The method of claim 7, wherein the step of assigning the one or more prototype vectors occurs at a predetermined epoch.

9. The method of claim 1 further comprising: deleting at least one of the one or more prototype vectors during a training process.

10. The method of claim 1 further comprising: revising at least one of the one or more prototype vectors during a training process.

11. The method of claim 1 further comprising: modifying at least one of the one or more prototype vectors during a training process.

12. The method of claim 1, wherein the sequence encoder is a long short-term memory (LSTM) network.

13. The method of claim 1, wherein the sequence encoder is a bi-directional LSTM network.

14. The method of claim 1, wherein the sequence encoder is a gated recurrent unit (GRU) network.

15. A system for implementing a prototype sequence machine learning network, comprising:
    a processor operable to:
        map one or more labeled sequence datasets using a sequence encoder to generate an embedded vector having a fixed length;
        determine a score between the embedded vector and one or more prototype vectors to generate one or more similarity vectors, wherein a diversity regularization value is applied to the one or more prototype vectors to penalize at least a first of the one or more prototype vectors that is similar to a second of the one or more prototype vectors; and
        classify one or more prediction values using a fully-connected layer that applies a weight matrix against the one or more similarity vectors.

16. The system of claim 15, wherein the processor is further operable to:
    compute a predicted probability for the one or more labeled sequence datasets using a softmax layer that divides an exponential of the one or more prediction values by a sum of the one or more prediction values.

17. A method for implementing a prototype sequence machine learning network, comprising:
    mapping one or more labeled sequence datasets using a sequence encoder to generate an embedded vector having a fixed length;
    determining a score between the embedded vector and one or more prototype vectors to generate one or more similarity vectors; and
    classifying one or more prediction values using a fully-connected layer that applies a weight matrix against the one or more similarity vectors, wherein the fully-connected layer includes a sparsity penalty and a non-negative constraint that constrains the weight matrix to one or more positive values, wherein the sparsity penalty and the non-negative constraint improve a learning process for the prototype sequence machine learning network such that the one or more prototype vectors have more unitary and additive semantics.

18. The method of claim 16 further comprising:
computing a predicted probability for the one or more labeled sequence datasets using a softmax layer that divides an exponential of the one or more prediction values by a sum of the one or more prediction values.

19. A method for implementing a prototype sequence machine learning network, comprising:
mapping one or more labeled sequence datasets using a sequence encoder to generate an embedded vector having a fixed length;
determining a score between the embedded vector and one or more prototype vectors to generate one or more similarity vectors, wherein the one or more prototype vectors are projected to a subsequence of events within a training dataset and wherein a beam search algorithm is implemented to select a candidate that is determined to be substantially equal to the one or more prototype vectors; and
classifying one or more prediction values using a fully-connected layer that applies a weight matrix against the one or more similarity vectors.

20. The method of claim 19 further comprising:
computing a predicted probability for the one or more labeled sequence datasets using a softmax layer that divides an exponential of the one or more prediction values by a sum of the one or more prediction values.

\* \* \* \* \*